June 7, 1932.  L. E. LITTLE ET AL  1,861,806

BOTTLE HANDLE

Filed April 9, 1930

INVENTOR
Lonnie F. Little
BY Henry T Mazb

F. P. Lorin
ATTORNEY

Patented June 7, 1932

1,861,806

UNITED STATES PATENT OFFICE

LONNIE E. LITTLE AND HENRY T. MAIB, OF GRANDVIEW, WASHINGTON

BOTTLE HANDLE

Application filed April 9, 1930. Serial No. 442,961.

This invention is directed to a removable handle structure designed primarily for use in the convenient handling of bottles and the like, and particularly milk bottles.

The invention is directed to providing a gripping element operable in the movement of the handle proper into and out of gripping cooperation with the bottle, the relation of the parts being such that when the handle is in operative position and the weight of the device suspended therefrom, the gripping element is in position to engage and grip the bottle, while when the handle is in inoperative position, that is, turned down out of lifting position, the gripping element is automatically freed from its gripping cooperation with the bottle and may, if desired, be conveniently separated from the bottle.

The invention is illustrated in the accompanying drawing, in which:—

Figure 1:
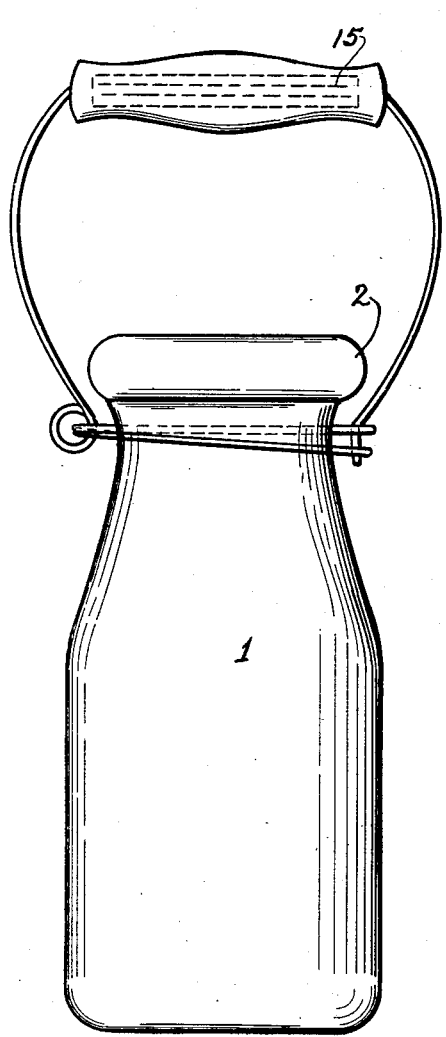
Figure 1 is a view in side elevation showing the improved handle in operative relation to a bottle, such as a milk bottle.

The improved handle structure is designed more particularly for use with milk bottles of the type wherein the bottle 1 is usually provided with a lip 2 defining in effect a lateral enlargement at the upper end of the bottle. The gripping element proper is constructed of wire made up as an open-ended ring. The respective ends of the ring-like gripping element are formed with terminal eyes 4 and 8, the element diametrically opposite the open ends being further formed or provided with an eye 5. The gripping element illustrated is preferably constructed of wire having gripping lengths 3 and 7 projected beyond the eye 5, with each of such lengths terminating in an eye, as 4 and 8.

The handle proper consists of a wire length having a central portion 11 to receive a convenient hand grip 11a. From the central portion the wire of the handle proper extends in two lengths 9 and 12, the length 9 extending through the eye 8 of the gripping section 7 and being more or less loosely connected to the eye 4 of the gripping section 3, as at 10. The wire length 12 of the handle proper terminates in an eye 13 interconnected with the eye 5, as at 6. The wire length 9 of the handle proper is formed adjacent its connection with the eye 4 with an off-set curved portion 15a. If desired, advertising or other appropriate matter may be printed or placed on the wooden hand grip 11a, as indicated at 15 in Figure 1.

Figure 2:
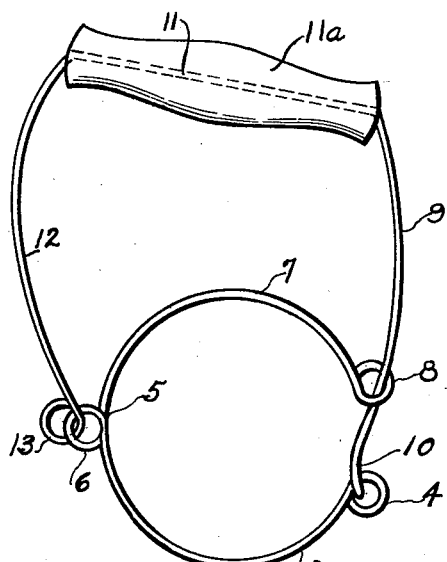
Figure 2 is a plan of the improved construction, the handle proper being shown in position to release the gripping element.
Figure 3:
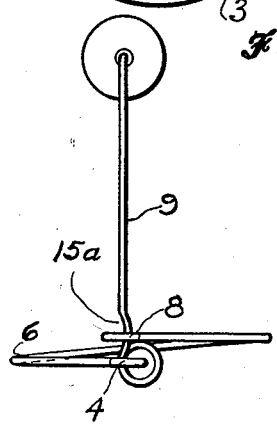
Figure 3 is a view in elevation of the same, with the handle proper in position to insure a gripping action of the gripping element.

The inherent resiliency of the gripping element is such as to tend to separate the eyes 4 and 8, this resiliency being such that when the eyes 4 and 8 are separated, the gripping member may be readily passed over the bead 2 of the bottle 1. When the handle proper is in lowered position, as indicated in Figure 2, it will be apparent that the wire length 9 of the handle proper will be substantially horizontally disposed with respect to the eyes 4 and 8, thereby permitting the natural resiliency of the gripping member to separate these eyes on the wire length 9. As the handle is raised to the elevated or carrying position, the wire length 9 tends to move the eye 8 of the section 7 of the gripping member into substantially vertical alignment with the eye 4 of the section 3, thereby forcing the sections to a reduced diameter and gripping the bottle beneath the bead 2 and permitting the bottle to be handled and carried merely through the handle proper, as will be evident.

As the eye 8 of the gripping section 7 is moved into more or less vertical relation with the eye 4 of the gripping section 3, said eye 8 rides into the off-set curved portion 15a of the wire length 9, serving as a temporary retarding or locking means to prevent casual displacement, requiring in effect a positive movement of the handle proper to open the gripping member.

We claim:—

A removable handle structure including an open ring inherently influenced to spread its ends, an eyelet formed intermediate its length, other eyelets formed at its extremities, a handle member having one end secured to said intermediate eyelet, the other end passed through one of the eyelets formed on the extremities of the ring and secured to the other eyelet, whereby sliding connection is made with one end of the ring and when the handle is in a vertical position the eyelets formed on the extremities of the ring are superimposed and the ring contracted.

In testimony whereof we affix our signatures.

LONNIE E. LITTLE.
HENRY T. MAIB.